United States Patent
Giladi

(10) Patent No.: US 11,778,013 B2
(45) Date of Patent: *Oct. 3, 2023

(54) SEGMENT LADDER TRANSITIONING IN ADAPTIVE STREAMING

(71) Applicant: Comcast Cable Communications, LLC, Philadelphia, PA (US)

(72) Inventor: Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,182

(22) Filed: Sep. 28, 2022

(65) Prior Publication Data

US 2023/0026649 A1   Jan. 26, 2023

Related U.S. Application Data

(63) Continuation of application No. 17/228,562, filed on Apr. 12, 2021, now Pat. No. 11,489,899.

(51) Int. Cl.
*G06F 15/16* (2006.01)
*H04L 65/75* (2022.01)

(52) U.S. Cl.
CPC .................. *H04L 65/75* (2022.05)

(58) Field of Classification Search
CPC ........................................... H04L 65/75
See application file for complete search history.

(56) References Cited

U.S. PATENT DOCUMENTS

| | | | |
|---|---|---|---|
| 10,958,947 B1* | 3/2021 | Wei | H04N 21/2407 |
| 11,101,906 B1* | 8/2021 | Jiang | H04H 20/12 |
| 11,146,839 B1* | 10/2021 | Stroffolino | H04L 65/80 |
| 11,277,620 B1* | 3/2022 | Liu | H04N 19/184 |
| 2013/0091297 A1 | 4/2013 | Minder et al. | |
| 2014/0185466 A1 | 7/2014 | Syed et al. | |
| 2018/0035139 A1* | 2/2018 | Giladi | H04L 65/762 |
| 2020/0252663 A1* | 8/2020 | Giladi | H04N 21/8456 |
| 2021/0084354 A1 | 3/2021 | May, Jr. et al. | |
| 2021/0195259 A1* | 6/2021 | Giladi | H04N 21/4402 |
| 2021/0235140 A1* | 7/2021 | Han | H04N 21/234363 |
| 2021/0360260 A1* | 11/2021 | Rehman | H04N 19/103 |
| 2021/0368182 A1* | 11/2021 | Pandit | H04N 21/23439 |
| 2021/0385513 A1* | 12/2021 | Lintz | H04N 21/23439 |
| 2021/0400256 A1* | 12/2021 | Sireaev | H04N 21/44008 |

(Continued)

FOREIGN PATENT DOCUMENTS

WO   2018/005835 A1   1/2018

OTHER PUBLICATIONS

Giladi Alexander, Massively Parallel Open Source Encoding for Adaptive Streaming, Jan. 2019, IEEE, 8 pages (Year: 2019).*

(Continued)

*Primary Examiner* — Oleg Survillo
(74) *Attorney, Agent, or Firm* — BakerHostetler

(57) ABSTRACT

Methods and systems are described for delivering and playing streaming content. A plurality of adaptations sets may be generated for a content asset. The plurality of adaptation sets may have segments encoded according to different segment durations. A media device may transition between adaptation sets to perform a content transition operation.

48 Claims, 9 Drawing Sheets

(56) References Cited

U.S. PATENT DOCUMENTS

2022/0030247 A1* 1/2022 Olekas .................. H04N 19/60

OTHER PUBLICATIONS

Andrew Pearson: "Signalling of Content using SCTE Messaging", DVB, Digital Video Broadcasting, C/O EBU—17A Ancienne Route—CH-1218 Grand Saconnex, Genev-Switzerland, May 6, 2019, 33 Pages.

DVB Organization: "Ansi_Scte 217 2017.pdf", DVB, Digital Video Broadcasting, C/O EBU—17A Ancienne Route—CH-1218 Grand Saconnex, Geneva—Switzerland, Aug. 7, 2017, 13 Pages.

U.S. Patent Application filed on Apr. 12, 2021, entitled "Segment Ladder Transitioning In Adaptive Streaming", U.S. Appl. No. 17/228,562.

* cited by examiner

SEGMENT LADDER TRANSITIONING IN ADAPTIVE STREAMING

CROSS-REFERENCE TO RELATED APPLICATION

This application is a continuation of U.S. patent application Ser. No. 17/228,562, filed Apr. 12, 2021, which is hereby incorporated by reference in its entirety for any and all purposes.

BACKGROUND

Content delivery systems typically group media segments into representations that include content encoded at a given bitrate or quality. Segments from different representations may be time-aligned to enable switching across representations at any segment boundary. In certain scenarios, this approach results in latency performance problems. Streaming can only start, for example, at a segment boundary and a complete segment must be generated and transmitted to start streaming at the segment boundary, resulting in unnecessary delays in delivery of content.

SUMMARY

Disclosed herein are techniques for delivering and playing content, such as content streams. Different versions of the content may be generated corresponding to different adaptation sets. A "main" adaptation set may be created for content, as well as one or more "ladder" adaptation sets with segments of shorter duration than the segments of the main adaptation set. If a content transition operation (e.g., a trick mode operation, advertisement, channel change) is detected at a point other than a beginning or an endpoint of a main segment (e.g., a midpoint), a media device can access one of the ladder adaptation sets. The ladder adaptation sets may have fewer frames in a segment, including as few as a single frame per segment. This allows more granular access to frames by the media device to perform the content transition operation with less delay. If the transition operation is completed, the media device may gradually transition to other ladder adaptation sets and/or the main adaptation set to return to normal operation. Transitioning between one or more of the ladder adaptation sets and the main adaptation set can reduce start-up time associated with transitions. This may reduce latency of a streaming session while also maintaining an optimal compression efficiency by transitioning back to larger segment based adaptation sets if lower latency is not needed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
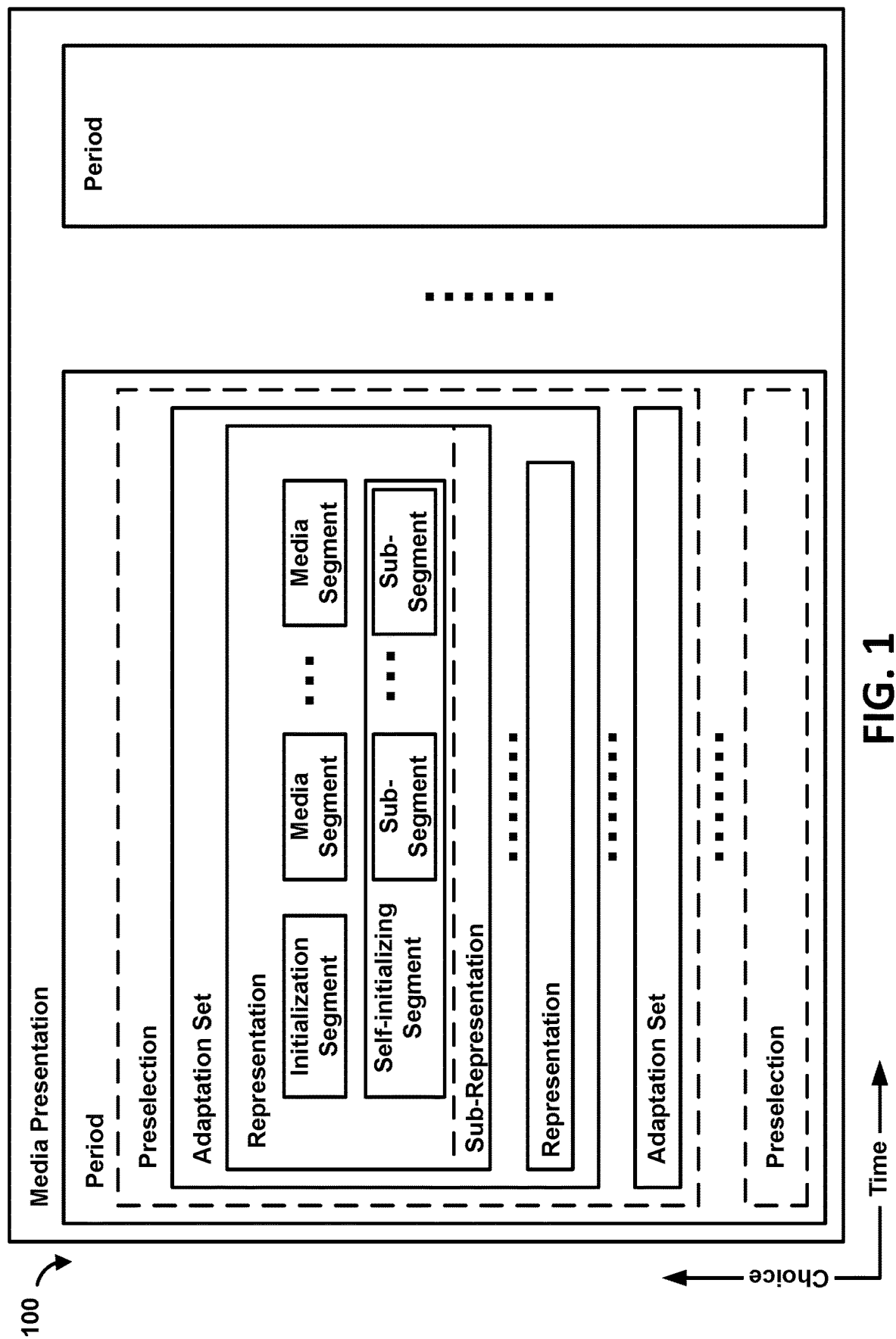
FIG. 1 shows an example of a hierarchical data model.

Disclosed herein are methods and systems for video encoding, storage and transmission, including achieving smoother and quicker transitions in performing content transition operations (e.g., channel changes, switching between regular content and ads, trick play). A content item, such as a show, movie, and/or the like may be encoded using a plurality of adaptation sets. The plurality of adaptation sets may comprise a main adaptation set (e.g., or primary adaptation set) and one or more ladder adaptation sets (e.g., or secondary adaptation set). The one or more ladder adaptation sets may be encoded with segments that are shorter in duration than the main adaptation set. If a content transition operation is detected, a media device may find the adaptation set that has a segment beginning at the same time as the content transition operation. This transition may involve analyzing and/or transitioning to multiple adaptation sets to find the closest match. If the content transition operation is over, the media device may transition back to the main adaptation set. In some scenarios, this transition may involve transitioning between multiple adaptation sets, each at the nearest segment boundary, until the main adaptation is accessed.

In conventional approaches, segments from different representations may be time-aligned and start from an Instantaneous Decoder Refresh (IDR) frame (e.g., in decoding order) in order to enable switching across representations at any segment boundary. Conventional approaches with 2-second segments may suffer from significant delay (e.g., 6 to 8 seconds) and join times are typically over 2 seconds because transitions are limited to the beginning of a new segment.

Long segment durations may result in higher compression efficiency due to smaller percentage of large intra-coded frames as opposed to typically much smaller inter-coded ones. Even better efficiency can be achieved in some cases where segments have variable duration such that the IDR frame matches the location of a scene boundary. However, because conventional streaming approaches can only start at a segment boundary and a complete segment must be generated and transmitted to start streaming at the segment boundary, longer segments also increase latency. Shorter segments, on the other hand, may decrease latency resulting from segment boundaries and segment generation, but sacrifice compression efficiency due to an increased percentage of intra-coded frames. These problems may be solved at least in part as well as other problems at least by eliminating the need to choose between decreasing latency and increasing compression efficiency. As disclosed herein, multiple adaptation sets may be used by a media device if a transition is expected in the middle of a segment.

The disclosed techniques may be implemented in the context of delivering content using adaptive content streaming, such as via Adaptive streaming over hypertext transfer protocol (HTTP). Adaptive streaming over HTTP became mainstream with the publication of the Apple HTTP Live Streaming (HLS) specification in 2009. MPEG DASH (ISO/IEC 23009-1:2012), is an international standard defining an adaptive streaming system. An adaptive content stream may comprise the following concepts: segments, representations, and manifests. These concepts are described in further detail below, but it should be understood that the disclosure is not limited to HLS or DASH based implementations of adaptive content streaming.

A segment may be the minimal individually addressable unit of data, e.g., a segment may be the entity that can be downloaded using uniform resource locators (URLs) advertised via a manifest. One example of a media segment may be a 2-second part of a linear broadcast, which starts at playout time 0:42:40, ends at 0:42:42, and can be downloaded within a 30-min buffer between 0:42:40 and 1:12:00.

A representation (e.g., also known as variant in HLS and track in CMAF) may be a single encoding version of content. As a non-limiting example, video encoded with the H.264 codec at bitrate of 4.20 Mbps, resolution of 1080p and frame rate of 59.94 fps may be a representation. Another representation may have a resolution of 780p.

A manifest may be a document which lists available representations. A manifest can be used to derive segment URLs and the time at which the segments can be downloaded and rendered. A typical asset may comprise (or consist of) tens of thousands of segments.

In the case of HLS, a manifest may be comprised of a "master playlist" and multiple "media playlists". A media playlist may represent a single variant (e.g., representation) and may list all media segments along with information such as timing. A master playlist may describe variants and contains URLs of media playlists. In case of MPEG DASH, a manifest is called a Media Presentation Description (MPD) and is an XML document. The DASH presentation may be defined using a hierarchical model. As a non-limiting example, a DASH hierarchical data model 100 from ISO/IEC 23009-1 is illustrated in FIG. 1.

As illustrated in FIG. 1, representations containing the same content (e.g., same video, same codec, but at different bitrates and resolutions) may be grouped into adaptation sets. Representations belonging to the same adaptation set may be time-aligned, which may imply that if one representation has a segment starting at some time T0 and ending at T1, all other representations within this adaptation set have a segment starting at T0 and ending at T1. As a result, representations can typically be switched at will at any segment boundary, e.g., for the purpose of rate adaptation to network conditions.

In some cases, representations belonging to different adaptation sets may be aligned between adaptation sets as well, such that some clients will be able to switch across adaptation sets. An example of this use case is separate adaptation sets for SD, HD, and UHD video where different encryption keys are used for different groups of resolutions. While SD-only players will only be able to play representations within the SD adaptation set, UHD-capable players will be able to play any representation within that period and switch across adaptation sets at any segment boundary.

DASH provides a flexible way of constructing segment URLs. Rather than listing all segments and their corresponding URLs, it may use a template where the URL is built given variables such as segment number, its presentation time, or the identifier of the representation it belongs to.

MPD also defines an example precise timing model for each segment. For any past, current, or future segment a wall-clock presentation time and availability window may be calculated. The availability window may comprise the time interval during which the segment is guaranteed to be available for download.

Figure 2:
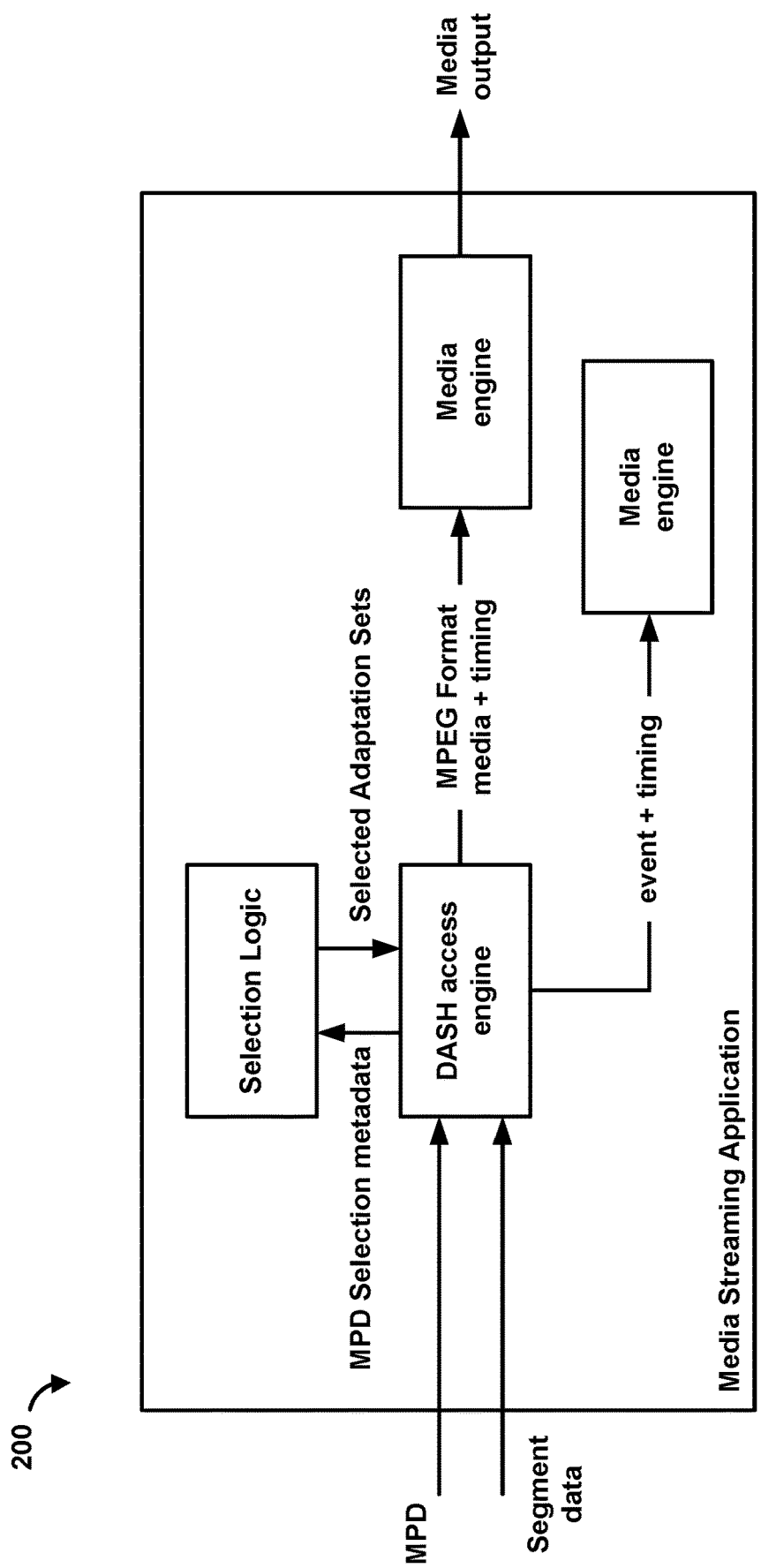
FIG. 2 shows an example of a media player.

As illustrated in FIG. 2, a DASH-based media player 200 (see ISO/IEC 23009-1) (a.k.a. media streaming application) may include multiple modules, such as the DASH client itself, advertisement, reporting, and various other pieces of business logic and UI.

The DASH client may include an access engine handling the download logic, a media engine handling buffering, decryption, and rendering, and a special media engine for handling events.

DASH events may be timed blobs, which contain information tied to media time. Examples of such events are information on ad breaks (SCTE 35), MPD update requests, or semantic events used in UI (e.g. event representing a goal scored during a football game). Some events (such as MPD update) are handled by the DASH client, some are passed to different parts of the player, such as advertisement logic (SCTE 35) or UI (goal scoring). Events can be carried in an MPD, in a media segment, or in a separate event-only representation.

A DASH client may perform any combination of the following tasks:

(1) download the MPD and parse it. If events are found in the MPD pass them to event handling media engine;

(2) let the application selection logic select adaptation sets to be played (e.g., which language or which codec should be selected);

(3) decide which representations will be played for every content component (e.g. which video bitrate) given data such as the current network conditions, state of the segment buffer (see item 6 below), and its estimates of future segment size and available bandwidth;

(4) derive the URL for the next segment (in each representation) and download it. For error resiliency and load balancing purposes there may be more than one URL per segment.

(5) parse the segment, extract events (if any), and pass the events to the event-handling media engine;

(6) place the downloaded segments into a segment buffer, where the segment buffer is measured in seconds, its fullness is expressed in a number of seconds worth of media versus the total buffer size, and is a FIFO structure where a number of downloaded segments are queued after download and prior to playback; and (7) if needed, the client downloads a new MPD and goes to step 1, otherwise it continues directly to step 3.

As described above with respect to DASH (e.g., FIG. 1), in the context of adaptive streaming, discrete independently playable parts of transmitted content are referred to as media segments and are typically two to ten seconds long. Media segments are typically transmitted by video delivery systems over Hypertext Transfer Protocol (HTTP), e.g., Moving Picture Experts Group (MPEG) Dynamic Adaptive Streaming over HTTP (DASH) or HTTP Live Streaming (HLS). Some video delivery systems may use other protocols, e.g., 3rd Generation Partnership Project (3GPP) File Delivery over Unidirectional Transport (FLUTE) and Advanced Television Systems Committee (ATSC) 3.0 Real-time Object delivery over Unidirectional Transport (ROUTE), to transmit media segments.

Media (e.g., video) content prepared for distribution using systems, such as DASH (e.g., FIG. 1), may be encoded in multiple representations. Representations can differ by properties such as bitrate, frame rate, resolution, number of audio channels, audio sampling rate, etc. For each representation, its media file may be partitioned into media segments, which are playable small chunks of media that are typically about two to ten seconds in duration. A client device may parse the media presentation description (MPD) and select a representation that the client has the ability to download and present. The client may then start requesting and downloading media segments and may continuously re-evaluate which representation offers the best quality and is sustainable under current network conditions.

Figure 3:
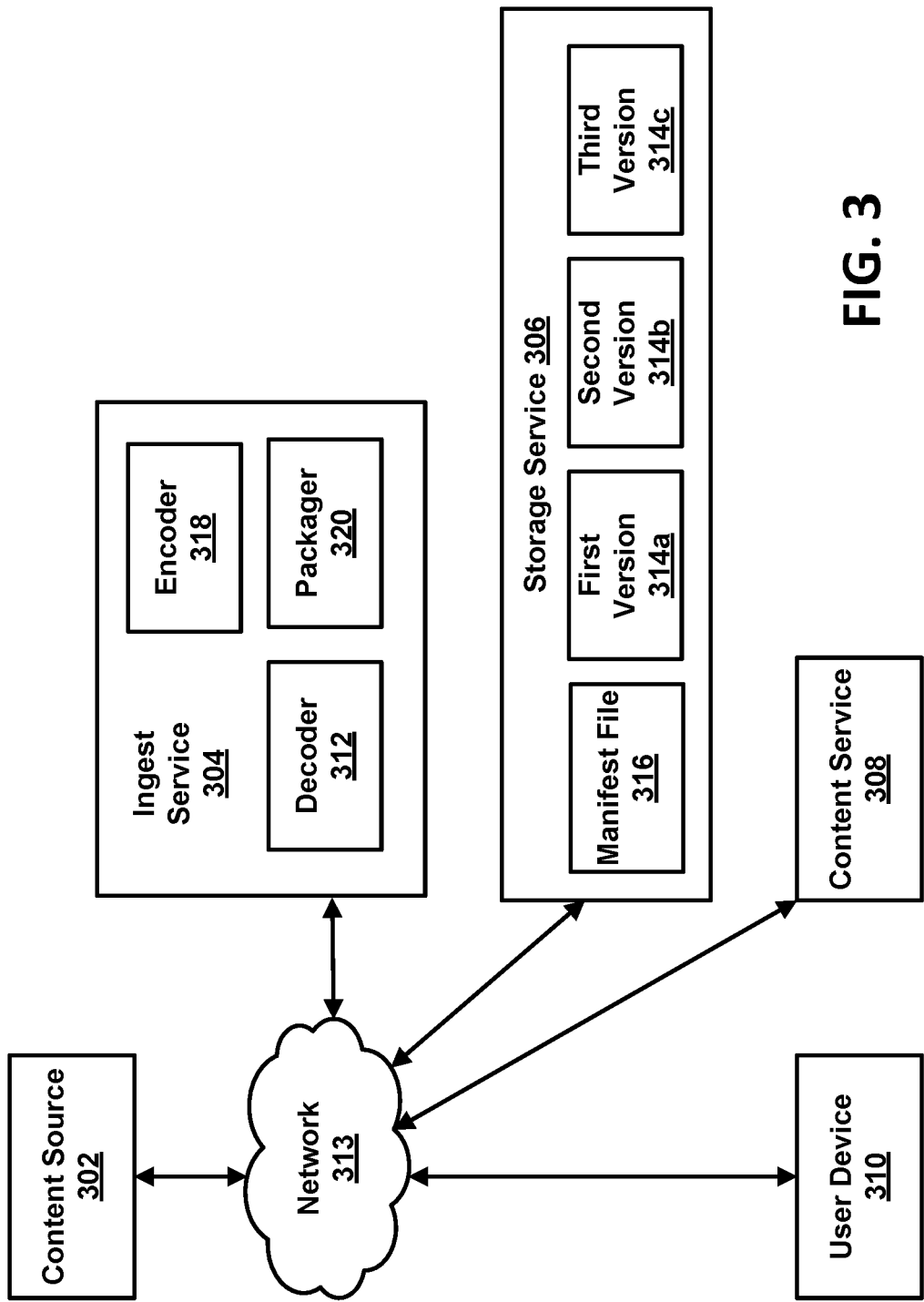
FIG. 3 shows an example system for adaptive streaming of content.

FIG. 3 is a block diagram showing an example system 300 for managing content. The system 300 may comprise one or more of a content source 302, an ingest service 304, a storage service 306, a content service 308, a user device 310, a decoder 312, an encoder 318, and a packager 320. The content source 302, the ingest service 304, the storage service 306, the content service 308, the user device 310, the decoder 312, the encoder 318, and the packager 320 or a combination thereof may be communicatively coupled via a network 313.

The network 313 may comprise a content distribution and/or access network. The network 313 may facilitate communication via one or more communication protocols. The network 313 may comprise fiber, cable, or a combination thereof. The network 313 may comprise wired links, wireless links, a combination thereof, and/or the like. The network 313 may comprise routers, switches, nodes, gateways, servers, modems, and/or the like.

The ingest service 304, the storage service 306, the content service 308, the decoder 312, the encoder 318, the packager 320, or a combination thereof may be implemented by one or more computing nodes. A computing node may comprise a virtual machine, processor, computing device, or a combination thereof. The ingest service 304, the storage service 306, the content service 308, the decoder 312, the encoder 318, and/or the packager 320 may each be implemented on separate computing nodes (e.g., on separate computing devices). The ingest service 304, the storage service 306, the content service 308, the decoder 312, the encoder 318, and/or the packager 320 may each be implemented on the same computing node (e.g., on the same computing device). The ingest service 304, the storage service 306, the content service 308, the decoder 312, the encoder 318, and/or the packager 320 may be implemented by a plurality of computing nodes. The plurality of computing nodes may be geographically dispersed (e.g., to allow efficient access to content). The ingest service 304, the storage service 306, the content service 308, the decoder 312, the encoder 318, and/or the packager 320 may be duplicated at various locations in the network 113.

The content source 302 may be configured to supply content (e.g., one or more content streams, content files, and/or the like). The content may comprise video data, audio data, closed caption (CC) data, a combination thereof, and/or the like. The content source 302 may comprise a content channel, a content stream source, a content file source, and/or the like. The content source 302 may be accessed by the ingest service 304 to determine one or more content assets.

The ingest service 304 may include a decoder 312, an encoder 318, and a packager 320. One or more of these components may be configured to insert one or more encoding characteristics of one or more content segments into a content description file. While each of the components 312, 318, and 320 are shown in FIG. 3 as being part of the ingest service 304, it is understood that one or more of the components may be located externally to the ingest service 304.

An input to the ingest service 304 (e.g., at the decoder 312) may include compressed or uncompressed media (e.g., video). In an example that the input includes compressed video, the video may be compressed with codecs such as VVC (H.266)/EVC/LC-EVC/AV1400, or codecs such as MPEG-2 (H.262, ITU-T 13818-2), MPEG-4 AVC (ITU-T H.264, ISO/IEC 14496-10), and HEVC (ITU-T H.265, ISO/IEC 23008-2), or any other similar type of media content. The decoder 312 may be configured as a decoder for one or more such standards. In an example that the input includes uncompressed video input, the decoder 312 may be configured to accept video over a serial digital interface (SDI) or an Ethernet hardware interface.

The ingest service 304 (e.g., the encoder 318 and/or packager 320) may be configured to encode multiple versions of one or more pluralities of content segments, such as a version of the content segments at a plurality of resolutions (e.g., 480p, 720p, 3080p, etc.) which may be packaged by the packager 320. The encoder 318 may generate one or more periods (e.g., to describe a part of the content with a start time and duration), as shown in FIG. 1. Periods may be used to delineate scenes or chapters. Periods may be used to separate ads from program content.

The ingest service 304 (e.g., the encoder 318 and/or packager 320) may be configured to determine (e.g., generate, encode, package) a plurality of versions of a content asset. The plurality of versions of the content asset may comprise a first version 314a of a content asset. The plurality of versions of the content asset may comprise a second version 314b of the content asset. The plurality of versions of the content asset may comprise additional versions of the content asset (e.g., a third/fourth/fifth/etc.). The first version 314a of the content asset may comprise a first plurality of segments encoded according to a first segment duration. The second version 314b of the content asset may comprise a second plurality of segments encoded according to a second segment duration. The second segment duration may be different than the first segment duration. The third version 314c of the content asset may comprise a third plurality of segments encoded according to a third segment duration. The third segment duration may be different than the first segment duration, and/or the second segment duration. The second segment duration may be shorter than the first segment duration. The third segment duration may be shorter than one or more of the first segment duration or the second segment duration. The third segment duration may be as short as a single frame. The second segment duration may be multiple frames. If the encoder 318 uses a mini-GOP (e.g., mini group of pictures) encode pattern, the second segment duration may be the number of frames in the mini-GOP. The first segment duration may be a plurality of groups of pictures and/or mini groups of pictures.

The ingest service 304 (e.g., the encoder 318 and/or packager 320) may be configured to associate the plurality of versions of the content asset with a corresponding plurality of adaptation sets. The first version 314a of the content asset may be associated (e.g., via a manifest file 316) with a first adaptation set. The second version 314b of the content asset may be associated with a second adaptation set. The third version 314c of the content asset may be associated with a third adaptation set. The ingest service 304 (e.g., the encoder 318 and/or packager 320) may be configured to encode separate representation sets for each of the first adaptation set, the second adaptation set, and the third adaption set. Each of the first adaptation set, the second adaptation set, and the third adaption set may be a copy of the same content asset (e.g., but encoded according to different segment durations). Each of the plurality of adaptation sets may comprise a plurality of representations (e.g., as shown in FIG. 1). If the first adaptation set has a 1080p representation, a corresponding second adaptation set may comprise the same content asset having a 1080p representation but encoded with a different segment duration. The plurality of adaptation sets may be generated as part of a single period.

The ingest service 304 (e.g., the encoder 318 and/or packager 320) may determine (e.g., create, generate) the plurality of adaptation sets (e.g., to accommodate a content transition operation). The first adaptation set may comprise the "main" (e.g., or primary) adaptation set. The content associated with the first adaptation set have the longest segment duration. The second adaptation set and the third adaptation sets may comprise one or more "ladder" (e.g., or secondary) adaptation sets L0 . . . LN with shorter segment durations. Adaptation set L0 may comprise, for example, the content segments of a shortest duration (e.g., single-frame segments), L1 may comprise content segments of a longer duration than L0, L2 may comprise content segments of a longer duration than L1, and so on, where LN comprises content segments of a shorter duration than the main adaptation set M. The second adaptation set and/or the third adaptation set may be any one of adaptation sets L0 through LN.

The ingest service 304 (e.g., the encoder 318 and/or packager 320) may be configured to implement a process for generating a manifest file 316 (e.g., media presentation description file, m3u8). The input to the process may comprise a plurality of segments, such as a collection of segments (e.g., stored in a single directory). An example process described may comprise a basic implementation in which only a single period is identified. The example process may be described for MPEG-DASH (e.g., FIGS. 1 and 2), but the process may be adapted to other content streaming techniques. One or more parts of the process may be repeated for additional periods associated with a content asset.

The manifest file 316 may indicate the plurality of versions of the content asset, the plurality of adaptation sets, relationships thereof, and/or the like in one or more manifest files (e.g., MPD documents). The manifest file 316 may comprise a description of each of the first version 314a, the second version 314b, and the third version 314c of the content asset. The manifest file may identify a first adaptation set, a second adaptation set, a third adaptation set, etc. The manifest file 316 may associate the first version 314a with the first adaptation set (e.g., as an attribute, child element, or sibling element of an XML element defining the first adaptation set). The manifest file 316 may associate the second version 314b with the second adaptation set. The manifest file 316 may associate the third version 314c with the third adaptation set, and so forth.

The manifest file 316 associated with the content asset may comprise an indication of any of hierarchical relationships (e.g., the period, adaptation set, representation, segments) shown in FIG. 1. The manifest file 316 may indicate a relationship between plurality of adaptation sets. The plurality of adaptation sets may be indicated as siblings in a data structure. The plurality of adaptation sets may be indicated as having the same parent data structure (e.g., period). The manifest file 316 may comprise an indication that plurality of adaptation sets are aligned at certain locations. The relationship may be indicated using a value in an XML attribute, element within an MPD document, a combination thereof, and/or the like. For each adaptation set with longer segment durations, the indication of the relationship may indicate one or more adaptation sets with shorter segment duration such that every segment boundary in a current adaptation set corresponds to a segment boundary in the one or more adaptation sets.

The manifest file 316 may be based on a template manifest file. Information about adaptation sets of the content segments may be determined from the template manifest for a general content asset. Manifests in an adaptive streaming content asset service are often similar in makeup for the content asset since the same level of service needs to be provided for all the content assets. A certain number or combination of media components (e.g., Video, Audio, Audio2, etc.) may be present as an identified adaptation set. Supplemental information about representations may be determined from default configuration settings associated with a content service, such as a content service used to access the content asset. Within the set of content segments, content information may be determined.

The ingest service 304 (e.g., the encoder 318 and/or packager 320) may be configured to cause the plurality of content segments (e.g., and other data, such as the manifest file 316 or content information) to be stored by the storage service 306. The plurality of segments may be caused to be stored in a directory, an object store, a logical location (e.g., location associated with a uniform resource identifier, such as a URL), and/or the like. The storage service 306 may be implemented via one or more storage devices. Multiple copies of the plurality of content segments may be stored on different storage devices at different geographic locations. The encoder 318 may be configured to pass compressed frames to the packager 320, which may generate (e.g., by subdividing the content) a plurality of content segments and manifests such as MPD (DASH) or m3u8 (HLS).

The content service 308 may be configured to manage the content stored by the content service 308. The content service 308 may be implemented as one or more servers of a content distribution network and/or content access network. The one or more servers may comprise an origin server, and edge server, a combination thereof and/or the like. The content service 308 may comprise a packaging service, such as a just in time packager, and/or the like.

The content service 308 may be configured to receive requests for content from a plurality of users. The content may comprise video data, audio data, closed caption (CC) data, a combination thereof, and/or the like. The content may comprise a plurality of content channels, such as live channels, streaming channels, cable channels, and/or the like. The content service 308 may comprise one or more servers. The content service 308 may be configured to send, based on a request from the user device 310, one or more of the first version 314a, the second version 314b, or the third version 314c of the content asset. The content service 308 may receive additional requests for different version of the content asset based on performance of a content transition operation.

The user device 310 may be configured to receive the content from one or more of the content service 308 or the storage service 306. The user device 310 may comprise a computing device, smart device (e.g., smart glasses, smart watch, smart phone), a mobile device, a tablet, a computing station, a laptop, a digital streaming device, a set-top box, a streaming stick, a television, and/or the like. The user device 310 may comprise media streaming application of FIG. 2.

The user device 310 may be configured to receive content via a communication unit. The communication unit may comprise a modem, network interface, and/or the like configured for communication via the network 113. The user device 310 may comprise a user interface unit. The user interface unit may be configured to cause display of a user interface. The user interface may be configured to allow the user to browse available content, such as content sent by the content service 308, content stored by the storage service 306, and/or the like. The user interface may be configured to allow users to request content, such as a content channel (e.g., or a content asset being supplied via a content channel), be stored (e.g., recorded) for later viewing. The user interface may be configured to cause storage of the content based on a configuration setting, such as a buffering setting associated with buffering content in storage (e.g., if a user begins watching a channel, if a rule is triggered, if the user is predicted to request the content at a time time).

The user device 310 may be configured to receive (e.g., at a decoder of the user device) compressed or uncompressed media (e.g., video), including video compressed with codecs such as JPEG4000 or Apple® ProRes, or codecs such as MPEG-2 (H.262, ITU-T 13818-2), MPEG-4 AVC (ITU-T H.264, ISO/IEC 14496-10), HEVC (ITU-T H.265, ISO/IEC 23008-2), or any other similar type of media content. In an example that an input to the user device 310 includes uncompressed video input, the user device 310 may be configured to accept video over a serial digital interface (SDI) or an Ethernet hardware interface The user device 310 may be configured to determine to perform a content transition operation associated with a content asset. A request, command, or other triggering event (e.g., advertisement) may cause the user device 310 to determine to perform the content operation. The content transition operation may be based on user input, such as a user inputting a command (e.g., via a remote control). The content transition operation may be based on predetermined logic associated with the content asset, such as content replacement logic, advertisement logic, and/or the like. The content transition operation may be playing an advertisement, performing a trick play mode, joining a content stream, changing a channel, or switching between playback modes.

The user device 310 may be configured to determine that the first version 314a of a content asset does not satisfy the content transition operation. The first version 314a of the content asset may not have a segment boundary and/or switching point that coincides with the expected time of the content transition operation. The user device 310 may instead rely on other version of the content to allow for execution of the content transition operation sooner and/or closer to the expected time. The user device 310 may determine a segment of the first version 314a relevant to the content transition operation. A time (e.g., segment time, stream time) and/or location (e.g., stream location) associated with the content transition operation may be determined. The segment may comprise the segment of the first version 314a that corresponds to the time and/or location.

The user device 310 may analyze the segment based on one or more conditions associated with the content transition operation. The duration, length, start point, endpoint, and/or the like of the segment may be analyzed and/or compared to a condition (e.g., requirement) associated with the content transition operation. The condition associated with the content transition operation may comprise a timing condition, such as a time to insert content (e.g., an advertisement), a time within the content to navigate to, and/or the like. The condition may be a location condition, such as a location within the stream to play (e.g., X number of frames from the current frame). The analyze may determine whether the segment satisfies the one or more conditions.

The user device 310 may determine whether a boundary point of the segment satisfies the one or more conditions. If the boundary point of the segment associated with the first version 314a of the content asset does not match the time of the transition event, a determination may be made to transition to another version of the content asset, such as the second version 314b of the content asset. If the boundary point does not match the condition, the user device 310 may not be able to perform the content transition operation and/or may encounter unnecessary delays disrupting the user experience. If the first version 314a does not have a boundary point and/or switching point that matches the time of the content transition operation, then a delay would likely be required to perform the content transition operation. This delay could degrade user experience, cause content to missed, cause delays, and/or the like. Instead, a different version of the content may be used with smaller segments to allow for better performance of the content execution operation.

If the segment does not satisfy the one or more conditions of the content transition operation, the user device 310 request the second version 314b of the content asset (e.g., instead of the first version 314a). The user device 310 may request segments of the second version 314b of the content asset from the content service 308. The user device 310 may be configured to access the content description file associated with the content asset. The user device 310 may detect a value (e.g., signal, configuration option) in the content description file indicating the presence of additional versions of the content. The value may be associated with versions of the content having different segment durations. The value may indicate information associated with transitioning between different versions. The second version 314b of the content may be accessed based on the value, the presence of additional content version in the content description value, the information associated with transitioning between the content versions, and/or the like.

The user device 310 may be configured to analyze the second version 314b of the content asset to determine whether the second version 314b satisfies the one or more conditions associated with content transition operation. The user device 310 may determine a segment of the second version 314b that relevant to the content transition operation. A time (e.g., segment time, stream time) and/or location (e.g., stream location) associated with the content transition operation may be determined. The segment may comprise the segment of the second version 314b that corresponds to the time and/or location. The segment may be analyzed to determine if the segment satisfies the one or more conditions. The one or more conditions may be conditions associated with a smother, faster, and/or the like execution of the content performance operation. If the segment satisfies the one or more conditions, the content transition operation may be performed using the second version 314b of the content. If the content transition operation is performed, the user device 310 may return to accessing the first version 314a of the content asset (e.g., by requesting segments of the first version 314a).

If the segment does not satisfy the one or more conditions, the user device 310 may access the third version 314c of the content asset. The user device 310 may continue to access additional versions of the content versions (e.g., each with a small or different segment size), until a version meeting the one or more conditions is determined. In some scenarios, the user device 310 may be able to analyze the versions of the content asset without accessing each version. The user device 310 may directly access the version that satisfies the one or more conditions. The user device 310 may not have time to analyze each of the content versions. The user device 310 may use a version based on a threshold. The threshold may a predefined threshold and/or a threshold that varies based on the expected time of the content transition operation. The threshold may be a threshold of segment length. If the segment length is less than the threshold, the corresponding version of the content may be used. The version may not perfectly match the time and/or location of the content version (e.g., but analyzing and/or switching the next version may take too much time). If the content operation performed, the user device 310 may return to the first version 314a of the content asset. The user device 310 may transition to the next largest segment size version of the content asset at corresponding transition points until the first version 314a is accessed. The user device 310 may directly access the first version 314a at the next available boundary point (e.g., by transitioning from the current version to the first version 314a, regardless of any intervening versions).

If the third version 314c satisfies the content operation, then the content operation may be performed using the third version 314c. If the content operation is complete, a transition may be made from the third version 314c to the first version 314a. In some scenarios, a transition may be made from the third version 314c to the second version 314b, then from the second version 314b to the first version 314a. Each transition may be made at a point where the current segment boundary point matches the boundary point of the next segment of the version to which the transition is being performed.

Though transitions have been described as occurring at segment boundary points, it should be understood that the disclosure is not limited to performing transitions at these points. In some implementations, transitions may take place to or from the middle of a segment (e.g., using reference picture resampling with the VVC). Slice headers may be modified in order to have a matching picture order count. To support this implementation, the encoder 318 may be configured to disallow reference from frames more than a certain threshold amount N of frames ago.

Figure 4:
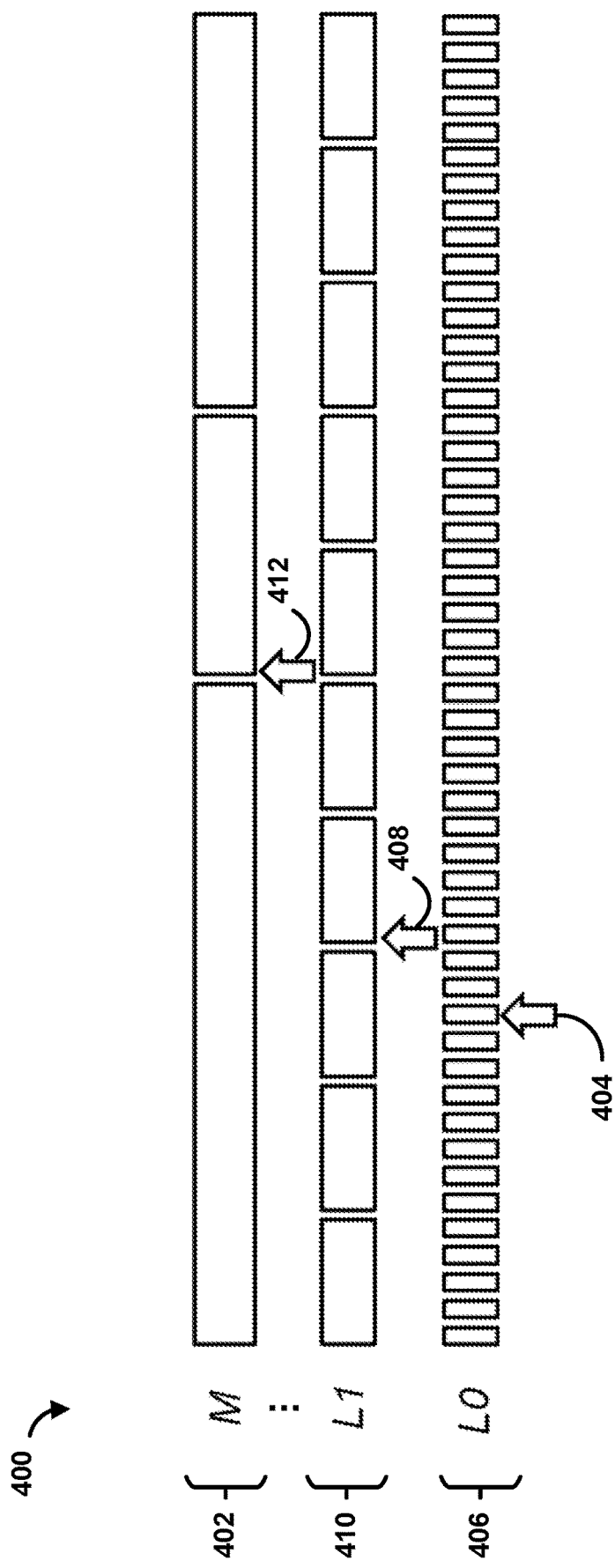
FIG. 4 shows an example of a transition between content versions.

FIG. 4 shows an example of a transition process 400 between content versions. The transition process 400 may be associated with a content transition operation, such as a join operation (e.g., starting a new stream, changing a channel, etc.). A "main" adaptation set 402 (e.g., "M") may contain time-aligned fixed-duration or variable-duration segments. The content transition operation may be expected (e.g., by a media device) at a point other than a beginning point or an end point (e.g., a midpoint) of a segment of the main adaptation set 402. The content transition may be initiated by a user at transition point 404. A user may change from one channel to another, thereby joining the content stream shown. A media device of the user may then join the content stream at transition point 404. As a default, the media device may try to join the main version of the content associated with the main adaptation set 404. Transition point 404, however, is in the middle of a content segment of the main adaptation set 402. For the user device to use this adaptation set, a delay would occur (e.g., until point 412). The media device may instead join a ladder adaptation set (e.g., L0, L1, etc.). The ladder adaptation set may be accessed before the main adaptation set. Multiple ladder adaptation sets may be available and/or identified in a manifest file downloaded by the user device. The ladder adaptation sets may have content segments with shorter durations than the content segments of the main adaptation set 402.

A ladder adaptation set 406 (e.g., L0) may comprise content segments of a shorter duration that the main adaptation set 402. Each segment of ladder adaptation set 406 may comprise or consist of a single frame of the content. At transition point 404, a media device may (e.g., at a join operation) start with a segment from adaptation set 406 and download the segments of adaptation set 406. The media device may determine that the main adaptation set 402 has a content segment that would require above a threshold wait time before content can begin playback. The media device may than identify the adaptation set indicated in the manifest file with the lowest segment length, which as shown in FIG. 4 is the ladder adaptation set 406, or L0. The L0 may have only one frame per segment. This allows for the media play to immediately download the segment at point 404, which may be a single frame. The media device may transition to one or more adaptation sets upon reaching (e.g., on a segment timeline) a next segment boundary of a next adaptation set. Continuing to access the L0 adaptation set may result in excessive bandwidth consumption as each frame may be an IDR frame not encoded based on a prior frame. The media device may analyze the manifest file to determine the nearest switching points for the adaptation sets with larger content segments. The media device may determine that the nearest switching point is at point 408 to the ladder adaptation set 410, or L1. The media device may transition from ladder adaptation set 406 to ladder adaptation set 410 at transition 408, e.g., the content segments of adaptation set 410 may be longer than the content segments of adaptation set 406. The media device may continue to download and play the segments from the L1 adaptation set until another switching point to reached. In this case, a switch from L1 directly to the main adaptation set is achieved. The media device may transition from ladder adaptation set 410 to the main adaptation set 402 at transition 412, e.g., the next segment boundary of the main adaptation set 402. In this manner, the media device is able to play the content stream to the user seamlessly using content segments of varying duration (e.g., hereby reducing delay as well as optimizing encoding efficiency).

Figure 5:
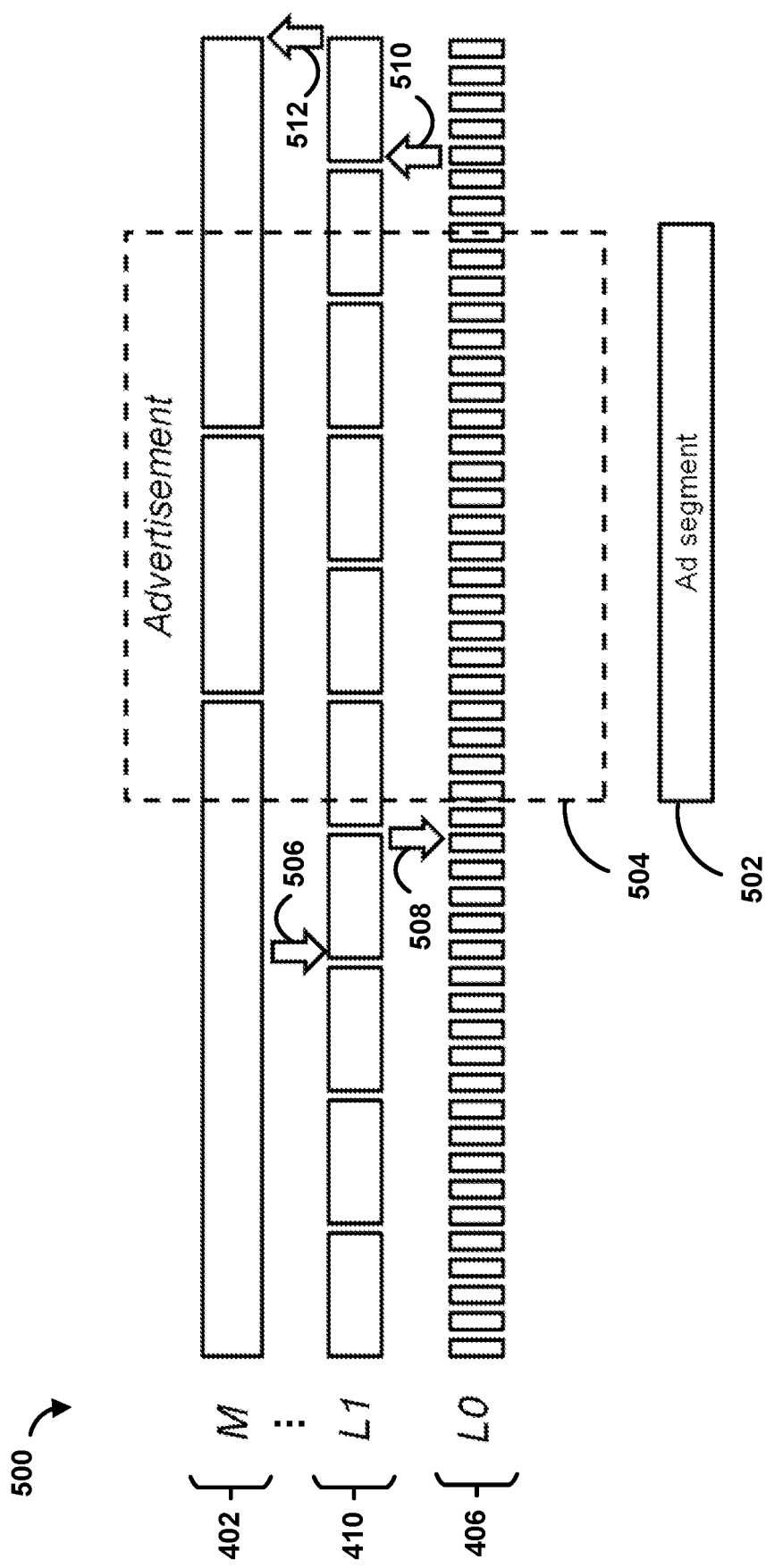
FIG. 5 shows an example of a transition between content versions.

FIG. 5 shows an example of a transition operation 500 between content versions. Content transition operation 500 may be, for example, a transition to an ad segment 502 associated with an advertisement 504. If a transition to an advertisement (e.g., advertisement 504) is expected in the middle of a segment (e.g., a segment of main adaptation set 402), then the media device may experience a delay in playing the advertisement, may cut off the advertisement, or may experience other problems. To allow the media device to prevent delays or any other similar problems, the media device may transition out of the main adaptation set 402 into any number of adaptation sets having content segments that are shorter in length (e.g., ladder adaptation set 410 and/or ladder adaptation set 406). The lengths may be progressively shorter from one ladder adaptation set to another. The media device may identify an upcoming transition to the ad segment. A signal in the content may announce the upcoming ad segment 502. The media device may have programming that automatically inserts advertisements according to any number of criteria, such as a default time. Not all content may have content segments that match the default time. The media device may adapt ad insertion to individual content streams by using the ladder adaption sets. The media device may request the shorter segments (e.g., single-frame segments) of ladder adaptation set 406 until the start of the advertisement (e.g., advertisement 504). After the end of the advertisement (e.g., advertisement 504), the media device may start playback from the one or more ladder adaptation sets and transition through one or more of the ladder adaptation sets to the main adaptation set, where each transition takes place at the nearest segment boundary of a segment associated with the adaptation set that is being transitioned to.

In a "trick mode," if playback is resumed at a specific frame (e.g. after pause, seek, fast forward or rewind), the media device may start playback from a ladder adaptation set having the smallest content segments (e.g., content segments that are a single frame of the content) L0 and transition through one or more of the ladder adaptation sets to the main adaptation set, where each transition takes place at the nearest segment boundary of a segment associated with the adaptation set that is being transitioned to.

As illustrated in FIG. 5, a "main" adaptation set 402 (e.g., "M") may contain time-aligned fixed-duration or variable-duration segments. The advertisement 504 may start and/or end at a point other than a beginning point or an end point (e.g., a midpoint) of a segment of the main adaptation set 402. The media device may determine this mismatch by analyzing information (e.g., time stamps, segment durations) in the manifest file listing the content segments of the main adaptation set.

A ladder adaptation set 410 (e.g., L1) may comprise content segments of a shorter duration than the main adaptation set 402. A ladder adaptation set 406 (e.g., L1) may comprise content segments of a shorter duration than the main adaptation set 402 and ladder adaptation set 406. Each segment of ladder adaptation set 406 may, for example, comprises or consist of a single frame of the content and each segment of ladder adaptation set 410 may comprise or comprises multiple frames of the content.

In the example illustrated in FIG. 5, a media device may transition from the main adaptation set 402 to ladder adaptation set 410 at transition point 506, e.g., a segment boundary of ladder adaptation set 410. Moreover, the media device may transition from ladder adaptation set 410 to ladder adaptation set 406 at transition point 508, e.g., a segment boundary of ladder adaptation set 406. Using these adaptation sets, the media device may gradually transition to a content segment that will have a boundary point matching the ad insertion point 504. This may prevent any unnecessary delay or cutting off content due to the advertisement. As illustrated in FIG. 5, the media device may download and display the ad segment 502 without disrupting the media content because the advertisement 504 is positioned at a beginning/end point of a content segment of ladder adaptation set 406.

As further illustrated in FIG. 5, the media device may resume downloading and playing the content segments of adaptation set 406 at the conclusion of the advertisement 504. The media device may transition to one or more adaptation sets upon reaching (e.g., on a segment timeline) a next segment boundary of a next adaptation set. With each transition, the media player is able to access longer content segments, resulting in more efficient use of bandwidth. The media device may transition from ladder adaptation set 406 to ladder adaptation set 410 at transition 510 (e.g., the content segments of adaptation set 410 may be longer than the content segments of adaptation set 406). Moreover, the media device may transition from ladder adaptation set 410 to the main adaptation set 402 at transition 512 (e.g., the next segment boundary of the main adaptation set 402).

A long segment (e.g., a segment from main adaptation set 402) may be downloaded at a decreased rate due to various connectivity-related issues (e.g., slower than real time). Moreover, a client buffer may contain an insufficient number of content segments (e.g., from main adaptation set 402) and the client may cancel the segment download. The client may parse a part of the segment which was successfully downloaded and identify the last "good" frame timestamp (e.g., timestamp associated with the last successfully downloaded frame). To address any of these issue, the client may switch into an adaptation set having content segments with a shorter length (e.g., ladder adaptation set 406 or ladder adaptation set 410) until a next segment boundary (e.g., transition 408/412/510/512) of an adaptation set having content segments with a longer length (e.g., ladder adaptation set 410 or main adaptation set 402).

A large number of HTTP GET requests may be used to access segments. To avoid this issue, the server may use a server push process to deliver multiple content segments (e.g., from ladder adaptation set 406 or ladder adaptation set 410) in response to a single HTTP GET request (e.g., HTTP/2 or HTTP/3). In case of HTTP/3, the server may promise a large number of segments and the client may cancel segments beyond the boundary of a segment from any longer adaptation set (e.g., the main adaptation set). Switching from one adaptation set to another may comprise sending a notification to a server to cancel receiving segments of a representation of the adaptation set.

The content segments in the main adaptation set 402 may comprise a mini-GOP structure of duration T frames (e.g., for a plurality of ladder adaptation sets L0, L1, . . . LN). A content segment from the main adaptation set 406 may contain some integer number of mini-GOPs and a content segment from the LN adaptation set may contain content segments with T frames each. Moreover, additional adaptation sets LN−1 . . . LN-n may contain shorter content segments with smaller durations which are submultiples of T. Lastly, there may be an adaptation set L0 containing single-frame segments.

A transition may start at L0, L0 segments may be downloaded until the nearest L1 segment boundary (e.g., longer segments), and the process may continue until reaching the M segment boundary (e.g., for main adaptation set 402). Similarly, as illustrated in FIG. 5, a switch to inserted content may go from M segments to LN, then LN−1, and, lastly, to L0.

A faster tune-in into the M segments (e.g., main adaptation set 402) is possible if Versatile Video Coding (VVC) encoding is used. An encoder may keep the same reference structure within all multi-frame segments (e.g., L2 . . . LN and M), may signal reference picture resampling, and may keep picture order count the same across all segments. The encoder may break M segments into mini-GOP sized chunks, each accessible by HTTP GET request. Only the first chunk of each segment may start from an IDR frame and the rest may start with an arbitrary frame (e.g., P or reference B). The encoder may also limit the reference frame distance to a certain threshold (e.g., 0.5 seconds) so that a given frame at time t will not reference a frame earlier than t−0.5 s. Moreover, the switching may happen at a chunk boundary (e.g., rather than a segment boundary).

Figure 6:
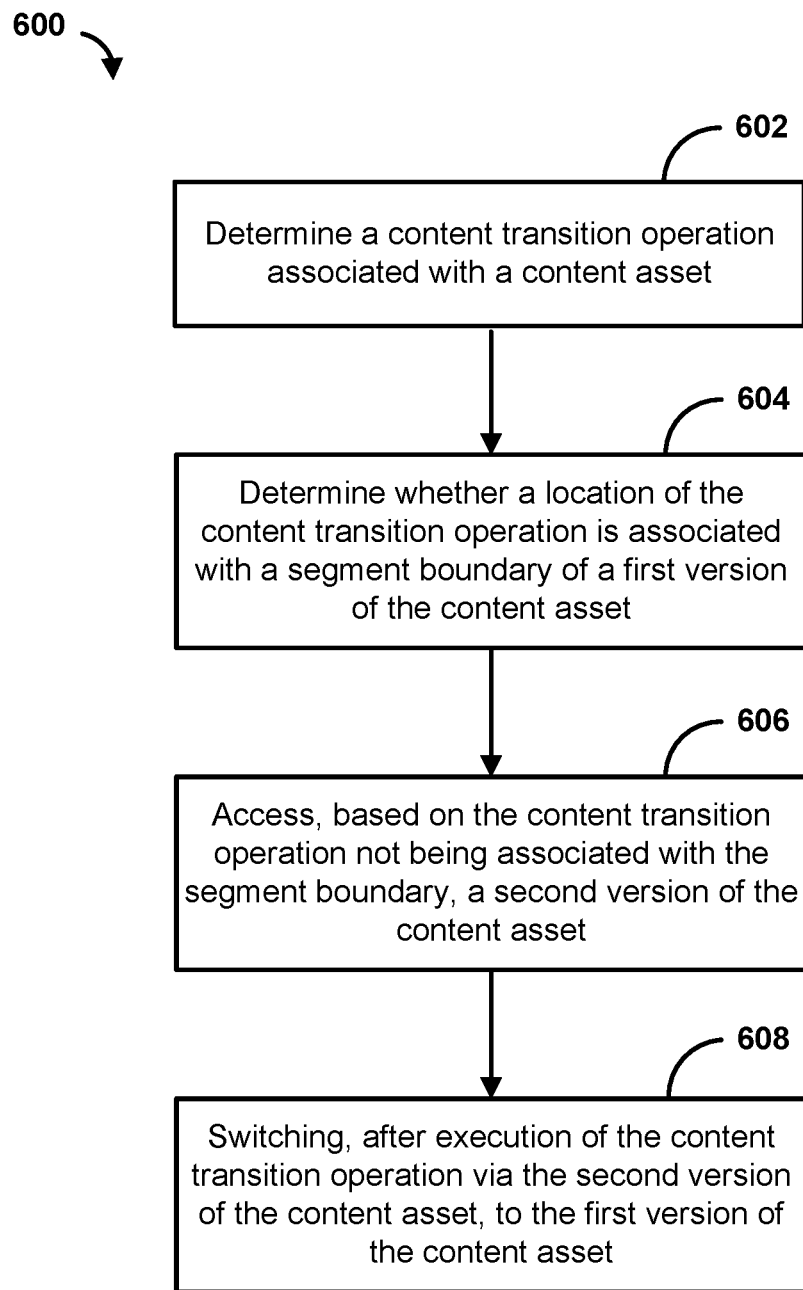
FIG. 6 shows an example method for playing streaming content.

FIG. 6 shows an example method 600 for playing streaming content (e.g., video and/or audio). The method 600 can comprise a computer implemented method. The method 600 can be implemented by one or more devices (e.g., computing devices, servers) and/or services disclosed herein, such as the devices, storage, and/or services of FIG. 2, FIG. 3, and FIG. 9.

At step 602, a content transition operation may be determined. The content transition operation may be associated with a content asset. The content transition operation may be associated with a first version of the content asset. The first version of the content asset may comprise a first plurality of segments associated with (e.g., encoded according to) a first segment duration. The first version of the content asset may be associated with (e.g., in a manifest file) a first adaptation set. The first version may be one of several content representations (e.g., each representation corresponding to a different resolution or bit rate, such as HD, SD, UHD) identified in the first adaptation set.

The determination of the content transition operation may be made by a first device (e.g., user device 310). The content transition operation may be based on user input, such as a user inputting a command. The content transition operation may be based on predetermined logic associated with the content asset, such as content replacement logic, advertisement logic, and/or the like. The logic may not take into account segment switching points. The result may be that the content transition operation occurs or is schedule to occur during the middle of a content segment. Accordingly, the techniques disclosed herein may be used to adapt the logic to any content stream. The content transition operation may be playing an advertisement, performing a trick play mode, joining a content stream, changing a channel, or switching between playback modes. The content asset may comprise video, audio, text, and/or the like. The content asset may comprise a video stream, audio stream, content stream, live stream, gaming stream, and/or the like.

At step 604, a determination may be made of whether a location of the content transition operation is associated with a segment boundary of the first version of the content asset. The location may be a location in the content stream, a time, segment location, and/or the like. It may be determined that the first version of a content asset does not satisfy the content transition operation.

The determination of whether the location of the content transition operation is associated with a segment boundary of the first version of the content asset (e.g., or that the first version of a content asset does not satisfy the content transition operation) may be based on analyzing a segment of the first plurality of segments. The duration, length, start point, endpoint, and/or the like of the segment may be analyzed and/or compared to a condition (e.g., requirement) associated with the content transition operation. The condition associated with the content transition operation may comprise a timing condition, such as a time to insert content (e.g., an advertisement), a time within the content to navigate to, and/or the like. The condition may be a location condition, such as a location within the stream to play (e.g., X number of frames from the current frame). A segment (e.g., the current segment) of the first plurality of segments of the content asset may not satisfy the content transition operation.

A time and/or location may be determined for the content transition operation. A determination may be made of whether a boundary point of a segment associated with the first version of the content asset matches the time and/or of the content transition operation. If the boundary point of the segment associated with the first version of the content asset does not match the time of the transition event, a determination may be made to transition to another version of the content asset, such as the second version of the content asset. The segment may comprise a current segment being played, a future segment, a prior segment, and/or the like. The analysis may comprise determining based on segment sizes of the first plurality of segments, which segment is nearest a location and/or time associated with the content transition operation. The nearest segment may be analyzed to determine the segment's boundary points (e.g., start point, end point). If none of the segment's boundary points match the location and/or time associated with the content transition operation, then a determination may be made to transition to a different version of the content asset.

The location of the content transition operation may comprise a location identified on a segment timeline (e.g., or content timeline, content stream timeline). Determining whether the location of the content transition operation is associated with the segment boundary of the first version of the content asset may comprise identifying the location on the segment timeline. The location may be a time on the segment timeline, a number of frames from a current location, the current time at which the content asset is being accessed, and/or the like. The location on the segment timeline may be identified based on timing of joining streaming content (e.g., at a midpoint of a content stream), a trick mode operation (e.g., fast-forward or rewind operation) that changes a location in a content stream, and/or timing associated with an advertisement. A determination may be made that the location is associated with a first point between a start point and an endpoint of a segment of the first plurality of segments. A determination may be made that the location does not match the end point, and/or the like. A triggering event may cause step 402. The triggering event may comprise a request event (e.g., a request for one or more content segments associated with the content asset, a request to perform the content transition operation), detecting a change to the content asset, a failure event (e.g., failure to identify a transition point of the first version of the content that satisfies a requirement of the content transition operation), a combination thereof, and/or the like.

At step 606, a second version of the content asset may be accessed (e.g., switched to, received, rendered, played, requested). The second version of the content asset may be accessed (e.g., switched to) by the first device (e.g., user device 310). The second version of the content asset may be received from the second device (e.g., a server, content service 308). The second version of the content may be accessed (e.g., switched to) based on the determination of step 602 and/or 604. The second version of the content may be accessed based on the content transition operation not being associated with (e.g., not matching) the segment boundary of the first version. A segment boundary of the second version may be associated with the location of the content transition operation. A content description file may comprise a value (e.g., signal, configuration option) indicating the presence of additional versions of the content. The value may be associated with versions of the content having different segment durations. The value may indicate information associated with transitioning between different versions. The first device may read the content description file to determine the value. The second version of the content may be accessed based on the value, the presence of additional content version in the content description value, the information associated with transitioning between the content versions, and/or the like.

The second version of the content asset may comprise a second plurality of segments encoded according to a second segment duration different than the first segment duration. The second version of the content asset may be associated with (e.g., in the manifest file) a second adaptation set. The second version may be accessed by requesting segments of the content asset associated with a representation in the second adaption set. The second segment duration (e.g., a single frame of the content asset) may be shorter than the first segment duration (e.g., multiple frame of the content asset). The second version of the content asset may be associated with a decreased latency time (e.g., latency for outputting the content asset to the user) relative to the first version of the content asset. The second segment duration may correspond to fewer frames, groups of pictures, and/or the like than those corresponding to the first segment duration.

At step 608, a switch to the first version of the content may be performed. The switch to the first version may be made after execution (e.g., via the second version) of the content transition. Switching to the first version may comprise requesting a content segment identified in the first adaptation set. The switch to the first version may be made from the second version. The first version of the content asset may be accessed (e.g., switched to, received, rendered, played, requested). The first version of the content asset may be accessed (e.g., or switched to) by the first device (e.g., user device 310). The first version of the content asset may be received from the second device (e.g., a server, content service 308). The first version may be accessed (e.g., or switched to) based on performance of the content transition operation using at least the second version of the content asset. The second version of the content asset may be accessed (e.g., temporarily) prior to, during, and/or following the content transition operation. If the content transition operation is complete, then a transition from the second version of the content asset to the first version of the content asset may be performed. Performance of the content transition operation using at least the second version of the content asset may be based on a location of a transition point on a segment timeline. The transition point may be a point at which a transition from version to another version is available. The transition from the second version to the first version may take place at a nearest segment boundary (e.g., segment endpoint, start point) of a segment associated with the first version of the content asset.

A third version of the content asset may be accessed (e.g., switched to) received, rendered, played, requested). The third version of the content asset may be accessed (e.g., switched to) by the first device (e.g., user device 310). The third version of the content asset may be received from the second device (e.g., a server, content service 308). The third version may be accessed (e.g., switched to) based on determining that the second version of the content asset does not satisfy the content transition operation. The third version of the content asset may comprise a third plurality of segments associated with (e.g., encoded according to) a third segment duration different than the first segment duration and the second segment duration. The second version of the content access may be accessed based on performance of the content transition operation using at least the third version of the content asset. The third segment duration may be shorter than the second segment duration.

The third segment duration may be only a single frame. The second segment duration may be multiple frames, a group of pictures, a mini group of pictures. In some scenarios, the third segment duration may be multiple frames and the second segment duration may be only a single frame. The first segment duration may be a plurality of groups of pictures and/or mini groups of pictures. If the third version satisfies the content operation, then the content operation may be performed using the third version. If the content operation is complete, a transition may be made from the third version to the first version. In some scenarios, a transition may be made from the third version to the second version, then from the second version to the first version. In some scenarios, third version may not satisfy the content operation and/or may not have a segment boundary associated with the location of the content operation. A switch may be made from the third version to the second version of the content asset based on the location of the content transition operation not being associated with the segment boundary of the third version. Each transition may be made at a point where the current segment boundary point matches the boundary point of the next segment of the version to which the transition is being performed.

Figure 7:
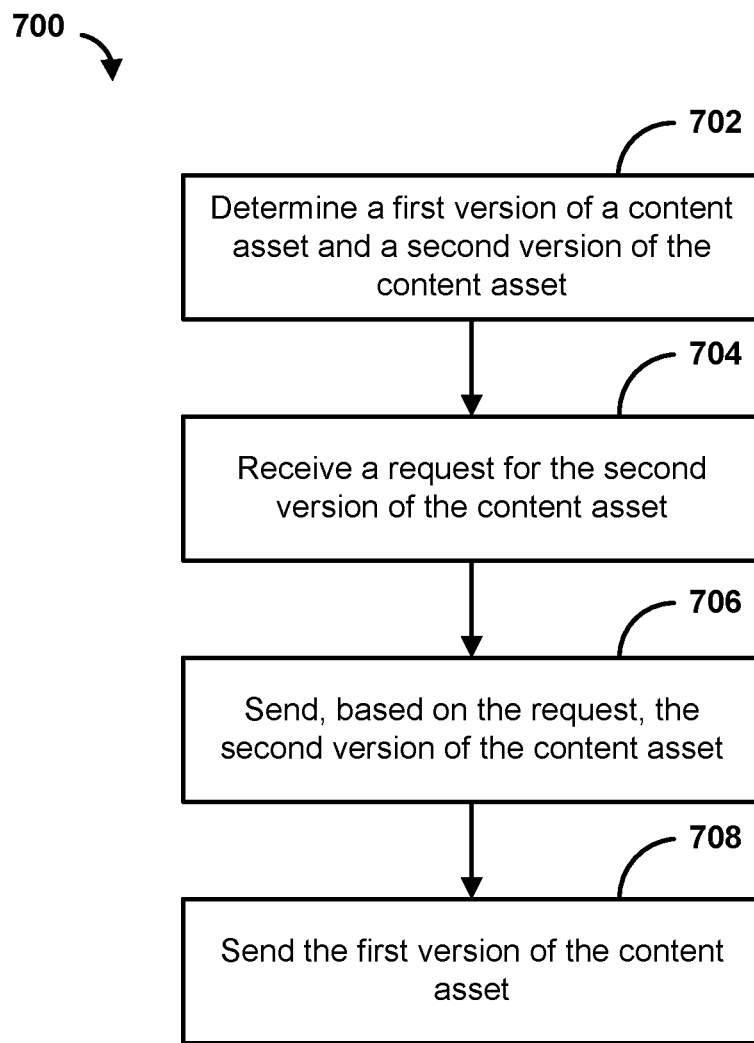
FIG. 7 shows an example method for delivering streaming content.

FIG. 7 shows an example method 700 for delivering streaming content (e.g., video and/or audio). The method 700 can comprise a computer implemented method. The method 700 can be implemented by one or more devices (e.g., computing devices, servers) and/or services disclosed herein, such as the devices, storage, and/or services of FIG. 2, FIG. 3, and FIG. 9.

At step 702, a first version of a content asset and a second version of a content asset may be determined. The first version of the content asset may comprise a first plurality of segments associated with (e.g., encoded according to) a first segment duration. The second version of the content asset may comprise a second plurality of segments associated with (e.g., encoded according to) a second segment duration different than the first segment duration. The first version of the content asset may be associated with (e.g., in a manifest file associated with the content asset) a first adaptation set. The second version of the content asset may be associated with (e.g., in the manifest file) a second adaptation set. The content asset may comprise video, audio, text, and/or the like. The content asset may comprise a program, show, movie, sporting event, living event, broadcast event, news cast, and/or the like.

A triggering event may cause step 702. The triggering event may comprise a request event (e.g., a request for one or more content segments associated with the content asset), detecting a change to the content asset), a packaging event (e.g., packaging of the content asset), a failure event (e.g., failure to complete packaging of the content asset, a configuration failure), a combination thereof, and/or the like.

At step 704, a request for the second version of the content asset may be received. The request may be based on the first version of the content asset not satisfying a content transition operation. The request may be based on a segment boundary of the first version not being associated with (e.g., not matching) a location of the content transition operation. The segment boundary may be a different location within the content than the location of the content transition operation. The content transition operation may comprise, for example, playing an advertisement, performing a trick play mode, joining a content stream, changing a channel, or switching between playback modes. A time and/or location of the content transition operation may be determined for the content transition operation. A determination may be made on whether a boundary point (e.g., the segment boundary) of a requested segment associated with the first version of the content asset matches the time of the content transition operation. If the boundary point of a segment associated with the first version of the content asset does not match the time of the content transition operation, then a determination may be made to transition to the second version of the content asset.

The location of the content transition may be a location on a segment timeline. The location on the segment timeline (e.g., or content timeline, content stream timeline) associated with the content transition operation may be identified. The location on the segment timeline may be identified based on timing of joining streaming content (e.g., at a midpoint of a content stream), a trick mode operation (e.g., fast-forward or rewind operation) that changes a location in a content stream, and/or timing associated with an advertisement. Determining that the first version of the content asset does not satisfy the content transition operation may comprise determining the location of the content transition operation is associated with a first point between a start point and an endpoint of a segment of the first plurality of segments.

At step 706, a second version of the content asset may be sent. Sending the second version may comprise sending a segment of a representation set associated with the second version and/or second adaptation set. The second version may be sent based on the request for the second version of step 704. A segment boundary of the second version of the content asset may be associated with (e.g., match, be within a threshold of) the location of the content transition operation. The second segment duration (e.g., associated with a single frame, or a single group of pictures) may be shorter than the first segment duration (e.g., associated with multiple frame and/or multiple groups of pictures). The second version of the content asset may be associated with a decreased latency time relative to the first version of the content asset.

At step 708, the first version of the content asset may be sent. The first version of the content asset may be sent based on (e.g., after) execution of the content transition operation using at least (e.g., or via) the second version of the content asset. Execution of the content transition operation using at least the second version of the content may comprise starting the content transition operation at the segment boundary bound of the second version of the content asset. The second version of the content asset may be sent prior to, during, or following the content transition operation. The content transition operation may be executed using at least the second version of the content asset. The second version may be used (e.g., instead of the first version) based on a location of a transition point on a segment timeline. The transition point may match a segment of the second version (e.g., but not match a segment of the first version). Requests for the segments of the second version may be received if the content transition operation is being performed, prior to performance, and/or after performance.

If the content transition operation is completed, a request may be received for a segment of the first version of the content. Transition from the second version of the content asset may take place at a nearest segment boundary (e.g., nearest to the current segment, most recently accessed segment) of a segment associated with the first version of the content asset.

A third version of the content asset may be determined. The third version of the content asset may comprise a third plurality of segments associated with (e.g., encoded according to) a third segment duration different than the first segment duration and the second segment duration. The third version may be associated with (e.g., via the manifest file) a third adaptation set. A request for the third version of the content may be received based on the first version of the content asset not satisfying the content transition operation. The request for the third version may be received based the segment boundary of the first version not being associated with (e.g., matching) the location of the content transition operation. One or more segments of the third version of the content asset may be sent based on the request. If the third version satisfies the content operation, then the content operation may be executed using the third version. Sending the second version of the content asset may be based on a segment boundary of the third version not being associated with the location of the content transition operation (e.g., or not satisfying the content operation). If the content operation is complete, a transition may be made from the third version to the first version. A request may be received for a segment of the first version. In some scenarios, a transition may be made from the second version, to the third version. Another transition may be made from the third version to the first versions. In some scenarios, a transition may be made from the third version to the second version, then from the second version to the first version. Requests may be received for the second version followed by requests for the first version. Each transition may be made at a point where the current segment boundary point matches the boundary point of the next segment of the version to which the transition is being performed.

Figure 8:
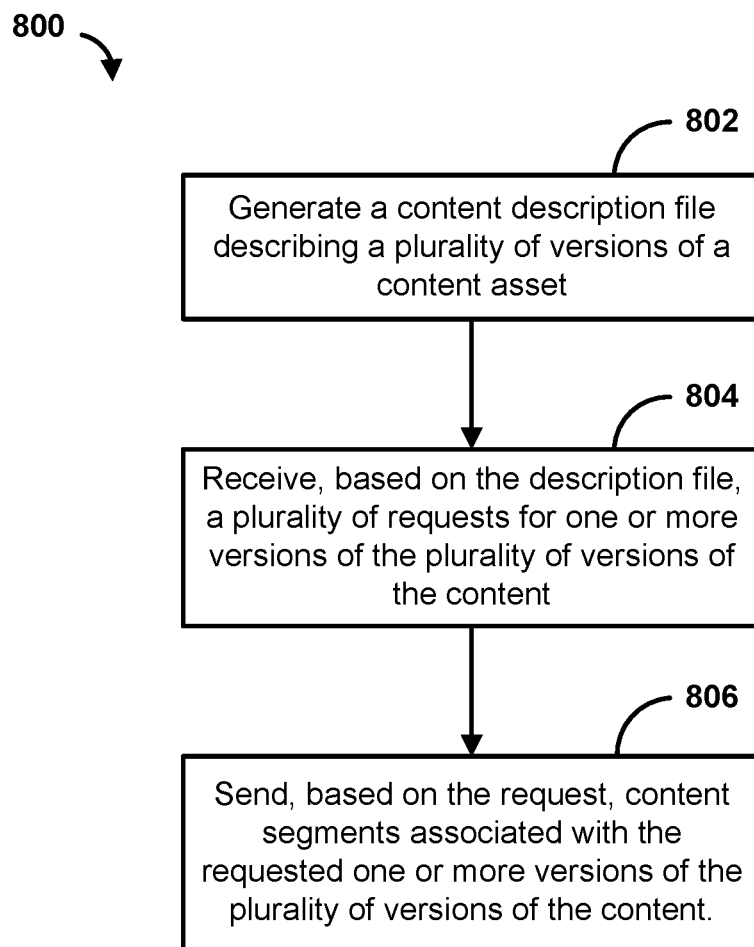
FIG. 8 shows an example method for streaming content.

FIG. 8 shows an example method 800 for streaming content. The method 800 can comprise a computer implemented method. The method 800 can be implemented by one or more devices (e.g., computing devices, servers) and/or services disclosed herein, such as the devices, storage, and/or services of FIG. 2, FIG. 3, and FIG. 9.

At step 802, a content description file may be generated. The content description file may describe a plurality of versions of a content asset. Generating the content description file may comprise inserting, in the content description file, a value indicating availability of switching between the plurality of versions of the content asset. A first version of the content asset, a second version of the content asset, and a third version of the content asset may be determined. The first version of the content asset may comprise a first plurality of segments associated with (e.g., encoded according to) a first segment duration. The second version of the content asset may comprise a second plurality of segments associated with (e.g., encoded according to) a second segment duration different than the first segment duration. The third version of the content asset may comprise a third plurality of segments associated with (e.g., encoded according to) a third segment duration different than the first segment duration and the second segment duration. One or more of the first version, the second version, or the third version may be indicated in the content description file.

The first version of the content asset may be associated with (e.g., in the content description file) a first adaptation set, the second version of the content asset may be associated with (e.g., in the content description file) a second adaptation set, and the third version of the content asset may be associated with (e.g., in the content description file) a third adaptation set. An adaptation set may be associated with each version of the content asset. Each adaptation set may have multiple representation sets associated with the content asset. The content asset may comprise video, audio, text, and/or the like. The content asset may comprise a program, show, movie, sporting event, living event, broadcast event, news cast, and/or the like.

A triggering event may cause step 802. The triggering event may comprise a request event (e.g., a request for one or more content segments associated with the content asset), a maintenance event (e.g., a deletion event, clean-up event), a storage event (e.g., receiving the content asset, detecting a change to the content asset), a packaging event (e.g., packaging of the content asset), a detection event (e.g., detection that a manifest is missing, inaccessible, and/or not in the directory in which the content asset is stored), a failure event (e.g., failure to complete packaging of the content asset, a configuration failure), a combination thereof, and/or the like.

At step 804, a plurality of requests for one or more versions of the plurality of versions of the content may be received. The plurality of requests may comprise a first request. The first request may be received based on satisfying a content transition operation. The content transition operation may comprise, for example, playing an advertisement, performing a trick play mode, joining a content stream, changing a channel, or switching between playback modes. A location on a segment timeline associated with the content transition operation may be identified. The first request may be a request based on a location of the content transition operation not being associated with a segment boundary line of one or more of the plurality of versions of the content asset. Satisfying the content transition operation may comprise determining the location is associated with a first point between a start point and an endpoint of a segment of a plurality of segments associated with a request. The start point may comprise the segment boundary line of the one of the plurality of versions of the content.

At step 806, content segments associated with the requested one or more versions of the plurality of versions of the content may be sent. The content segments may be sent based on the request received at step 804. The plurality of versions of the content (e.g., a main version and one or more ladder versions) may be sent or reside on the same content delivery network.

Figure 9:
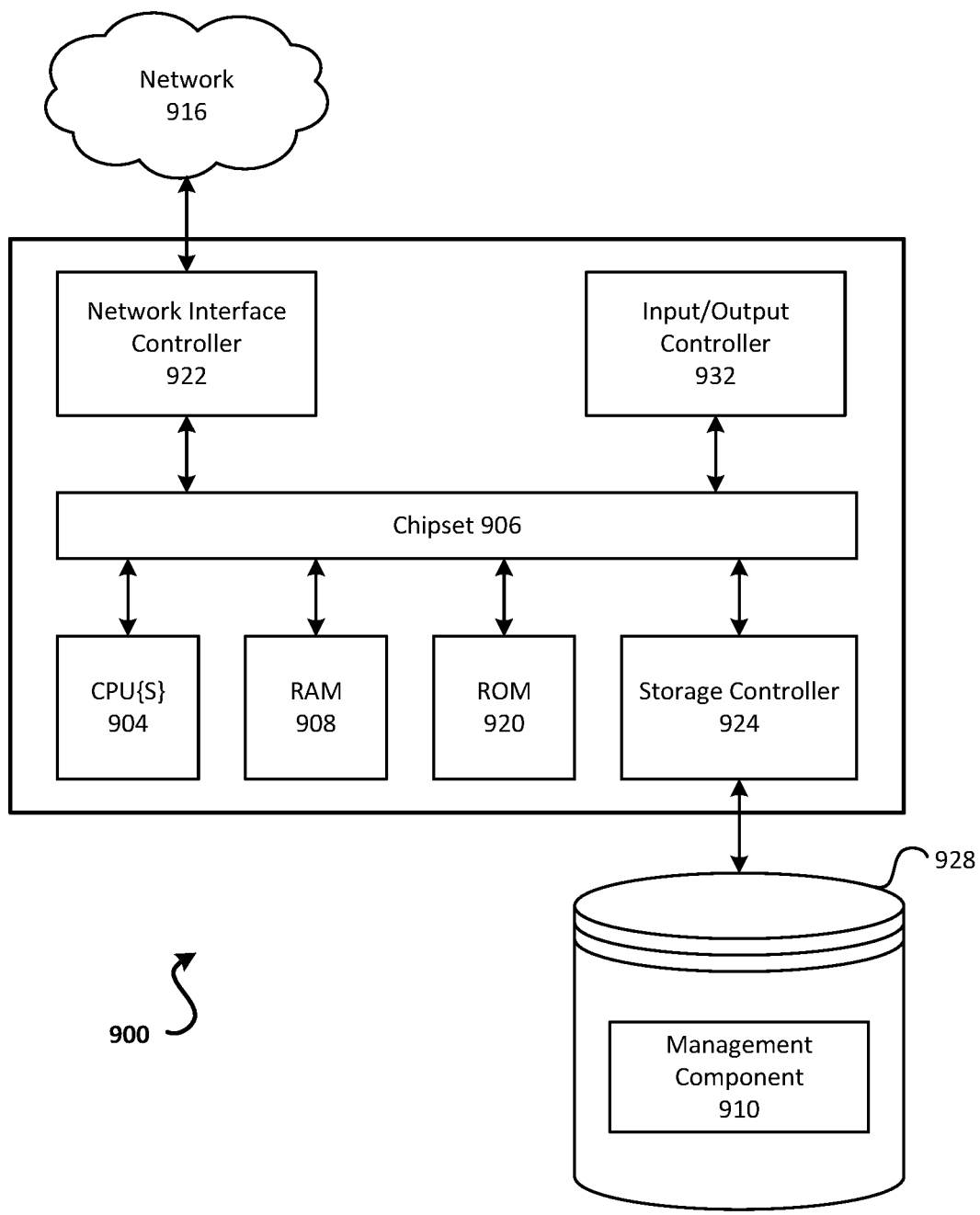
FIG. 9 is a block diagram illustrating an example computing device.

FIG. 9 depicts a computing device that may be used in various aspects, such as the servers, nodes, and/or devices depicted in FIG. 3. With regard to the example architecture of FIG. 3, the content source 302, ingest service 304, storage service 306, content service 308, user device 310, decoder 312, encoder 318, and packager 320 may each be implemented in an instance of a computing device 900 of FIG. 9. The computer architecture shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3-8.

The computing device 900 may comprise a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may further provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may comprise functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 928 that provides non-volatile storage for the computer. The mass storage device 928928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 928 is characterized as primary or secondary storage and the like.

The computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from the mass storage device 928 by detecting the physical states or characteristics of one or more particular locations within the physical storage units.

In addition to the mass storage device 928 described above, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may comprise volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described above. The computing device 900 may have access to computer-readable storage media storing computer-executable instructions, which, when executed by the computing device 900, may perform the methods described in relation to FIGS. 3-8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may comprise other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. Described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. Elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A device comprising:
one or more processors; and
memory storing instructions that, when executed, by the one or more processors, cause the device to:
    determine a content transition operation associated with a content asset;
    determine whether a location of the content transition operation is associated with a segment boundary of a first version of the content asset, wherein the first version of the content asset comprises a first plurality of segments associated with a first segment duration;
    access, based on the location of the content transition operation not being associated with the segment boundary, a second version of the content asset comprising a second plurality of segments associated with a second segment duration different than the first segment duration, wherein a segment boundary of the second version of the content asset is associated with the location of the content transition operation; and
    switch, after execution of the content transition operation via the second version of the content asset, to the first version of the content asset.

2. The device of claim 1, wherein the instructions that, when executed by the one or more processors, cause the device to determine whether the location of the content transition operation is associated with the segment boundary of the first version of the content asset comprises instructions that, when executed by the one or more processors, cause the device to identify the location on a segment timeline associated with the content transition operation and determine the location is between a start point and an endpoint of a segment of the first plurality of segments.

3. The device of claim 1, wherein execution of the content transition operation via the second version of the content asset comprises starting the content transition operation at the segment boundary of the second version of the content.

4. The device of claim 1, wherein the first version of the content asset is associated with a first adaptation set identified in a manifest file and the second version of the content asset is associated with a second adaption set identified in the manifest file, wherein switching to the first version comprises requesting a content segment identified in the first adaptation set.

5. The device of claim 1, wherein the second segment duration is shorter than the first segment duration.

6. The device of claim 1, wherein each segment of the second plurality of segments comprises only a single frame.

7. The of claim 1, wherein the instructions, when executed by the one or more processors, further cause the device to:
  access, based on determining whether the location of the content transition operation is associated with a segment boundary of the first version of the content asset, a third version of the content asset comprising a third plurality of segments associated with a third segment duration different than the first segment duration and the second segment duration; and
  switch, based on the location of the content transition operation not being associated with a segment boundary of the third version, to the second version of the content asset.

8. The device of claim 1, wherein the content transition operation comprises at least one of playing an advertisement, performing a trick play mode, joining a content stream, changing a channel, or switching between playback modes.

9. A non-transitory computer-readable medium storing instructions that, when executed, cause: determining a content transition operation associated with a content asset;
  determining whether a location of the content transition operation is associated with a segment boundary of a first version of the content asset, wherein the first version of the content asset comprises a first plurality of segments associated with a first segment duration;
  accessing, based on the location of the content transition operation not being associated with the segment boundary, a second version of the content asset comprising a second plurality of segments associated with a second segment duration different than the first segment duration, wherein a segment boundary of the second version of the content asset is associated with the location of the content transition operation; and
  switching, after execution of the content transition operation via the second version of the content asset, to the first version of the content asset.

10. The non-transitory computer-readable medium of claim 9, wherein determining whether the location of the content transition operation is associated with the segment boundary of the first version of the content asset comprises identifying the location on a segment timeline associated with the content transition operation and determining the location is between a start point and an endpoint of a segment of the first plurality of segments.

11. The non-transitory computer-readable medium of claim 9, wherein execution of the content transition operation via the second version of the content asset comprises starting the content transition operation at the segment boundary of the second version of the content.

12. The non-transitory computer-readable medium of claim 9, wherein the first version of the content asset is associated with a first adaptation set identified in a manifest file and the second version of the content asset is associated with a second adaption set identified in the manifest file, wherein switching to the first version comprises requesting a content segment identified in the first adaptation set.

13. The non-transitory computer-readable medium of claim 9, wherein the second segment duration is shorter than the first segment duration.

14. The non-transitory computer-readable medium of claim 9, wherein each segment of the second plurality of segments comprises only a single frame.

15. The non-transitory computer-readable medium of claim 9, wherein the instructions, when executed, further cause:
  accessing, based on determining whether the location of the content transition operation is associated with a segment boundary of the first version of the content asset, a third version of the content asset comprising a third plurality of segments associated with a third segment duration different than the first segment duration and the second segment duration; and
  switching, based on the location of the content transition operation not being associated with a segment boundary of the third version, to the second version of the content asset.

16. The non-transitory computer-readable medium of claim 9, wherein the content transition operation comprises at least one of playing an advertisement, performing a trick play mode, joining a content stream, changing a channel, or switching between playback modes.

17. A system comprising:
  a content device configured to store a plurality of versions of a content asset; and
  a computing device comprising one or more processors and instructions, that when executed by the one or more processors, cause the computing device to:
    determine a content transition operation associated with the content asset;
    determine whether a location of the content transition operation is associated with a segment boundary of a first version of the content asset, wherein the first version of the content asset comprises a first plurality of segments associated with a first segment duration;
    access, based on the location of the content transition operation not being associated with the segment boundary, a second version of the content asset comprising a second plurality of segments associated with a second segment duration different than the first segment duration, wherein a segment boundary of the second version of the content asset is associated with the location of the content transition operation; and
    switch, after execution of the content transition operation via the second version of the content asset, to the first version of the content asset.

18. The system of claim 17, wherein the instructions, that when executed by the one or more processors, cause the computing device to determine whether the location of the content transition operation is associated with the segment boundary of the first version of the content asset based on identifying the location on a segment timeline associated with the content transition operation and determining the location is between a start point and an endpoint of a segment of the first plurality of segments.

19. The system of claim 17, wherein execution of the content transition operation via the second version of the content asset comprises starting the content transition operation at the segment boundary of the second version of the content.

20. The system of claim 17, wherein the first version of the content asset is associated with a first adaptation set identified in a manifest file and the second version of the content asset is associated with a second adaption set identified in the manifest file, wherein switching to the first version comprises requesting a content segment identified in the first adaptation set.

21. The system of claim 17, wherein the second segment duration is shorter than the first segment duration.

22. The system of claim 17, wherein each segment of the second plurality of segments comprises only a single frame.

23. The system of claim 17, wherein the instructions, that when executed by the one or more processors, further cause the computing device to:
  access, based on determining whether the location of the content transition operation is associated with a segment boundary of the first version of the content asset, a third version of the content asset comprising a third plurality of segments associated with a third segment duration different than the first segment duration and the second segment duration; and
  switch, based on the location of the content transition operation not being associated with a segment boundary of the third version, to the second version of the content asset.

24. The system of claim 17, wherein the content transition operation comprises at least one of playing an advertisement, performing a trick play mode, joining a content stream, changing a channel, or switching between playback modes.

25. A device comprising:
  one or more processors; and
  memory storing instructions that, when executed, by the one or more processors, cause the device to:
    determine a first version of a content asset and a second version of the content asset, wherein the first version of the content asset comprises a first plurality of segments associated with a first segment duration and the second version of the content asset comprises a second plurality of segments associated with a second segment duration different than the first segment duration;
    receive a request for the second version of the content asset, wherein the request is based on a segment boundary of the first version not being associated with a location of a content transition operation;
    send, based on the request, the second version of the content asset, wherein a segment boundary of the second version of the content asset is associated with the location of the content transition operation; and
    send, after execution of the content transition operation via the second version of the content asset, the first version of the content asset.

26. The device of claim 25, wherein the location of the content transition operation is associated with a first point between a start point and an endpoint of a segment of the first plurality of segments.

27. The device of claim 25, wherein execution of the content transition operation via the second version of the content asset comprises starting the content transition operation at the segment boundary of the second version of the content.

28. The device of claim 25, wherein the first version of the content asset is associated with a first adaptation set in a manifest file associated with the content asset and the second version of the content asset is associated with a second adaption set in the manifest file.

29. The device of claim 25, wherein the second segment duration is shorter than the first segment duration.

30. The device of claim 25, wherein each segment of the second plurality of segments comprises only a single frame.

31. The device of claim 25, wherein the instructions, when executed by the one or more processors, further cause the device to:
  determine a third version of the content asset, wherein the third version of the content asset comprises a third plurality of segments encoded according to a third segment duration different than the first segment duration and the second segment duration;
  receive a request for the third version of the content asset, wherein the request is based on the segment boundary of the first version not being associated with the location of the content transition operation; and
  send, based on the request, the third version of the content asset, wherein sending the second version of the content asset is further based on a segment boundary of the third version not being associated with the location of the content transition operation.

32. The device of claim 25, wherein the content transition operation comprises at least one of playing an advertisement, performing a trick play mode, joining a content stream, changing a channel, or switching between playback modes.

33. A non-transitory computer-readable medium storing instructions that, when executed, cause:
  determining a first version of a content asset and a second version of the content asset, wherein the first version of the content asset comprises a first plurality of segments associated with a first segment duration and the second version of the content asset comprises a second plurality of segments associated with a second segment duration different than the first segment duration;
  receiving a request for the second version of the content asset, wherein the request is based on a segment boundary of the first version not being associated with a location of a content transition operation;
  sending, based on the request, the second version of the content asset, wherein a segment boundary of the second version of the content asset is associated with the location of the content transition operation; and
  sending, after execution of the content transition operation via the second version of the content asset, the first version of the content asset.

34. The non-transitory computer-readable medium of claim 33, wherein the location of the content transition operation is associated with a first point between a start point and an endpoint of a segment of the first plurality of segments.

35. The non-transitory computer-readable medium of claim 33, wherein execution of the content transition operation via the second version of the content asset comprises starting the content transition operation at the segment boundary of the second version of the content.

36. The non-transitory computer-readable medium of claim 33, wherein the first version of the content asset is associated with a first adaptation set in a manifest file associated with the content asset and the second version of the content asset is associated with a second adaption set in the manifest file.

37. The non-transitory computer-readable medium of claim 33, wherein the second segment duration is shorter than the first segment duration.

38. The non-transitory computer-readable medium of claim 33, wherein each segment of the second plurality of segments comprises only a single frame.

39. The non-transitory computer-readable medium of claim 33, wherein the instructions, when executed, further cause:
determining a third version of the content asset, wherein the third version of the content asset comprises a third plurality of segments encoded according to a third segment duration different than the first segment duration and the second segment duration;
receiving a request for the third version of the content asset, wherein the request is based on the segment boundary of the first version not being associated with the location of the content transition operation; and
sending, based on the request, the third version of the content asset, wherein sending the second version of the content asset is further based on a segment boundary of the third version not being associated with the location of the content transition operation.

40. The non-transitory computer-readable medium of claim 33, wherein the content transition operation comprises at least one of playing an advertisement, performing a trick play mode, joining a content stream, changing a channel, or switching between playback modes.

41. A system comprising:
a content device configured to store a plurality of versions of a content asset; and
a computing device comprising one or more processors and instructions, that when executed by the one or more processors, cause the computing device to:
determine a first version of the content asset and a second version of the content asset, wherein the first version of the content asset comprises a first plurality of segments associated with a first segment duration and the second version of the content asset comprises a second plurality of segments associated with a second segment duration different than the first segment duration;
receive a request for the second version of the content asset, wherein the request is based on a segment boundary of the first version not being associated with a location of a content transition operation;
send, based on the request, the second version of the content asset, wherein a segment boundary of the second version of the content asset is associated with the location of the content transition operation; and
send, after execution of the content transition operation via the second version of the content asset, the first version of the content asset.

42. The system of claim 41, wherein the location of the content transition operation is associated with a first point between a start point and an endpoint of a segment of the first plurality of segments.

43. The system of claim 41, wherein execution of the content transition operation via the second version of the content asset comprises starting the content transition operation at the segment boundary of the second version of the content.

44. The system of claim 41, wherein the first version of the content asset is associated with a first adaptation set in a manifest file associated with the content asset and the second version of the content asset is associated with a second adaption set in the manifest file.

45. The system of claim 41, wherein the second segment duration is shorter than the first segment duration.

46. The system of claim 41, wherein each segment of the second plurality of segments comprises only a single frame.

47. The system of claim 41, wherein the instructions, that when executed by the one or more processors, further cause the computing device to:
determine a third version of the content asset, wherein the third version of the content asset comprises a third plurality of segments encoded according to a third segment duration different than the first segment duration and the second segment duration;
receive a request for the third version of the content asset, wherein the request is based on the segment boundary of the first version not being associated with the location of the content transition operation; and
send, based on the request, the third version of the content asset, wherein sending the second version of the content asset is further based on a segment boundary of the third version not being associated with the location of the content transition operation.

48. The system of claim 41, wherein the content transition operation comprises at least one of playing an advertisement, performing a trick play mode, joining a content stream, changing a channel, or switching between playback modes.

* * * * *